(12) United States Patent
Fazeli et al.

(10) Patent No.: US 10,670,102 B2
(45) Date of Patent: Jun. 2, 2020

(54) SERVICING PROCEDURE FOR SINGLE-STAGE MIXED FLUID/GAS SHOCK STRUT

(71) Applicant: Goodrich Corporation, Charlotte, NC (US)

(72) Inventors: Amir Fazeli, Milton (CA); Adnan Cepic, Mississauga (CA); Susanne Reber, Strongsville, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 34 days.

(21) Appl. No.: 16/002,917

(22) Filed: Jun. 7, 2018

(65) Prior Publication Data

US 2018/0283484 A1    Oct. 4, 2018

Related U.S. Application Data

(62) Division of application No. 14/934,741, filed on Nov. 6, 2015, now Pat. No. 10,018,240.

(51) Int. Cl.
| | |
|---|---|
| *B64C 25/60* | (2006.01) |
| *F16F 9/32* | (2006.01) |
| *B64C 25/58* | (2006.01) |
| *B64F 5/40* | (2017.01) |
| *F16F 9/06* | (2006.01) |

(52) U.S. Cl.
CPC ............ *F16F 9/3271* (2013.01); *B64C 25/58* (2013.01); *B64C 25/60* (2013.01); *B64F 5/40* (2017.01); *F16F 9/06* (2013.01); *F16F 2230/46* (2013.01); *H05K 999/99* (2013.01)

(58) Field of Classification Search
CPC ... F16F 9/3271; F16F 2230/46; B64F 5/0081; B64C 25/60
See application file for complete search history.

(56) References Cited

U.S. PATENT DOCUMENTS

| | | | |
|---|---|---|---|
| 2,955,625 | A | 10/1960 | Patterson |
| 3,154,087 | A | 10/1964 | Beaver |

(Continued)

FOREIGN PATENT DOCUMENTS

| | | |
|---|---|---|
| JP | H11171097 A | 6/1999 |
| WO | 2010011635 | 1/2010 |
| WO | 2014184521 | 11/2014 |

OTHER PUBLICATIONS

Euopean Patent Office, European Search Report dated Mar. 23, 2017 in Application No. 16197134.6.
(Continued)

*Primary Examiner* — Jun S Yoo
(74) *Attorney, Agent, or Firm* — Snell & Wilmer, LLP

(57) ABSTRACT

Methods for servicing shock struts are provided. In various embodiments, a method for servicing a shock strut may comprise deflating the shock strut; compressing the shock strut until the shock strut is in a fully compressed position; and charging the shock strut with a liquid until a pressure of the liquid decreases a volume of a residual air located inside of the shock strut. In various embodiments, charging the shock strut with liquid under pressure may reduce the volume of trapped air inside of the shock strut to a negligible volume, eliminating the servicing variations.

4 Claims, 13 Drawing Sheets

(56) References Cited

U.S. PATENT DOCUMENTS

| | | | |
|---|---|---|---|
| 3,889,904 A * | 6/1975 | Jones | B64C 25/60 244/104 R |
| 5,148,896 A | 8/1992 | Ralph | |
| 9,045,237 B2 | 6/2015 | Nance | |
| 2016/0101877 A1 | 4/2016 | Airbus Operations Ltd | |
| 2017/0008648 A1* | 1/2017 | Pountney | B64F 5/40 |

OTHER PUBLICATIONS

Requirement for Restriction / Election dated Oct. 23, 2017 in U.S. Appl. No. 14/934,741.

Non-Final Rejection Office Action dated Jan. 31, 2018 in U.S. Appl. No. 14/934,741.

Notice of Allowance dated May 18, 2018 in U.S. Appl. No. 14/934,741.

Euopean Patent Office, Intent to Grant dated Jul. 24, 2018 in Application No. 16197134.6.

* cited by examiner

SERVICING PROCEDURE FOR SINGLE-STAGE MIXED FLUID/GAS SHOCK STRUT

CROSS REFERENCE TO RELATED APPLICATIONS

This application is a divisional of, and claims priority to, and the benefit of U.S. patent application Ser. No. 14/934,741, filed on Nov. 6, 2015, and entitled "SERVICING PROCEDURE FOR SINGLE-STAGE MIXED FLUID/ GAS SHOCK STRUT" which is incorporated by reference herein in its entirety.

FIELD

The present disclosure relates to landing gear, and more particularly, to systems and methods for increasing the serviceability of shock struts within landing gear.

BACKGROUND

Functionality and performance of a landing gear shock strut depends on its gas pressure and oil volume. Often, a shock strut assembly features a piston that compresses a fluid within a sealed chamber. The fluid typically includes a gas segment and a liquid segment. To this end, shock struts may be serviced with gas and hydraulic fluid on a regular basis to compensate for normal gas and oil leakage during operation. With typical single stage shock struts, the aircraft is lifted above the ground so that the shock strut can be cycled multiple times in attempt to fully remove any trapped gas internal to the shock strut during servicing. This can be time consuming, cumbersome, and/or costly.

SUMMARY

Methods for servicing a shock strut are provided. A method for servicing a shock strut may comprise: deflating the shock strut; compressing the shock strut until the shock strut is in a fully compressed position; and charging the shock strut with a liquid until a pressure of the liquid decreases a volume of a residual air located inside of the shock strut.

In various embodiments, the method may further comprise increasing the pressure of the liquid until a shock strut piston reaches a pre-determined extension. The method may further comprise charging the shock strut with a gas. The method may further comprise discharging a pre-determined volume of liquid from the shock strut. The shock strut may include a first valve and a second valve. The compressing may be performed via at least one of a jack or a weight of a vehicle, the vehicle supported at least in part by the shock strut. The method may further comprise lowering the jack until a shock strut piston is in a fully extended position.

A method for weight on wheel shock strut servicing may comprise: deflating the shock strut until the shock strut is in a fully compressed position; charging the shock strut with an oil until a pressure of the oil decreases a volume of a residual air located inside of the shock strut; and charging the shock strut with a gas until the gas comprises a pre-determined pressure.

In various embodiments, the charging the shock strut with the oil may comprise pumping the oil into a second valve and closing a first valve in response to the oil exiting the shock strut via the first valve. The deflating may comprise releasing the gas from the shock strut, wherein a weight of a vehicle, supported at least in part by the shock strut, compresses the shock strut. The pre-determined pressure may be determined, at least in part, based upon a servicing temperature. The method may further comprise increasing the pressure of the oil until a shock strut piston reaches a pre-determined extension. The pre-determined extension may be determined, at least in part, based upon a servicing temperature. The method may further comprise discharging a pre-determined volume of oil from the shock strut. The pre-determined volume of oil may be determined, at least in part, based upon a servicing temperature.

A method for weight off wheel shock strut servicing may comprise: deflating the shock strut; compressing the shock strut via a jack until the shock strut is in a fully compressed position; charging the shock strut with an oil until a pressure of the oil reduces a volume of a residual air located inside of the shock strut; lowering the jack until a shock strut piston reaches a pre-determined extension; and charging the shock strut with a gas until the gas comprises a pre-determined pressure.

In various embodiments the charging the shock strut with the oil may comprise pumping the oil into a second valve and closing a first valve in response to the oil exiting the shock strut via the first valve. The deflating may comprise releasing the gas from the shock strut. The pre-determined pressure may be determined, at least in part, based upon a servicing temperature. The pre-determined extension may be determined, at least in part, based upon a servicing temperature.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Aircraft landing gear systems in accordance with the present disclosure may comprise a shock strut. A shock strut may comprise various fluids such as oil and gas. Performance of the shock strut may be evaluated by monitoring aspects of the shock strut, including gas temperature, gas pressure, oil pressure, and stroke of the shock strut at various points during operation of the aircraft. Stroke may refer to a shock strut piston position. Servicing of a shock strut may be performed weight on wheel or weight off wheel or also a combination of weight on wheel and weight off wheel. Weight on wheel service refers to the servicing of a shock strut when the weight of a vehicle, such as an aircraft, is supported by the vehicles wheel assembly via at least one shock strut on the ground. Weight off wheel service refers to the servicing of a shock strut when the weight of a vehicle, such as an aircraft, is not supported by the vehicles wheel assembly via at least one shock strut on the ground. In the case of weight off wheel, the vehicles weight may be supported by the frame of the vehicle, such as an aircraft wing, for example.

Figure 1:
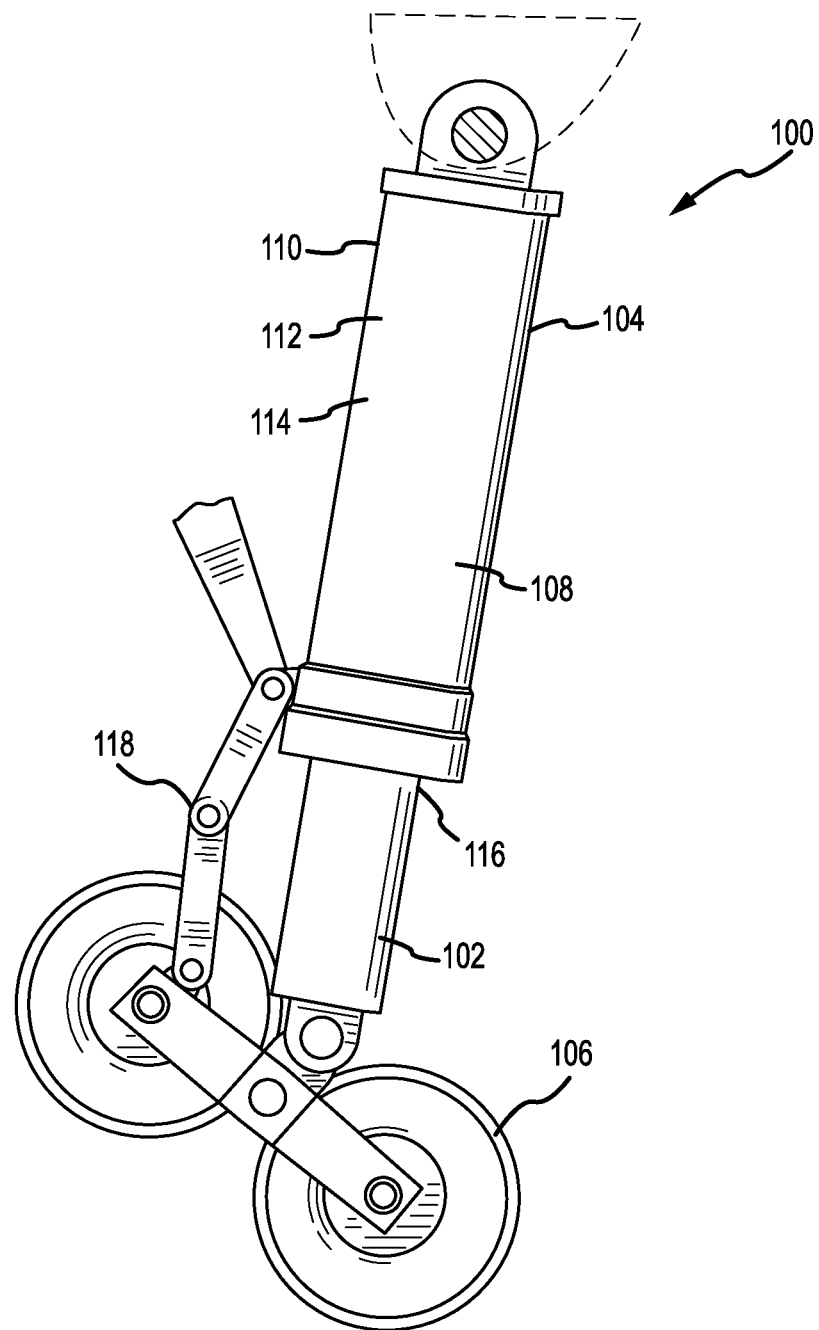
FIG. 1 illustrates, in accordance with various embodiments, a single stage shock strut for use in landing gear of an aircraft.

Accordingly, with reference to FIG. 1, a landing gear assembly 100 is illustrated. In various embodiments, landing gear assembly 100 comprises a shock strut 104. Shock strut 104 may be mechanically coupled to a wheel assembly 106. In various embodiments, shock strut 104 may be configured to absorb and dampen forces transmitted by wheel assembly 106 to an aircraft.

Shock strut 104 may comprise, for example, a piston 102 and a cylinder 108. Cylinder 108 may be configured to receive piston 102 in a manner that allows the two components to telescope together and absorb and dampen forces transmitted by wheel assembly 106.

In various embodiments, a liquid, such as hydraulic fluid or an oil, is located within cylinder 108. Cylinder 108 and piston 102 may, for example, be configured to seal such that liquid contained within cylinder 108 is prevented from leaking as piston 102 translates relative to cylinder 108. Further, cylinder 108 may be configured to contain a gas or air. Shock strut 104 may comprise a proximal end and a distal end, wherein the distal end is opposite the proximal end, the distal end being the end of the shock strut closest to a wheel or wheel assembly of a vehicle, such as wheel assembly 106, for example. The air may be positioned above the oil (referred to as an "air-over-oil" arrangement) or vice versa, where the term "above" in this context means in the direction of the proximal end of the shock strut. Similarly, cylinder 108 and piston 102 may be sealed such that gas and oil is prevented from leaking as piston 102 moves relative to cylinder 108. As such, shock strut 104 may comprise a pressurized environment within cylinder 108.

Shock strut 104 may further comprise, for example, a gas pressure sensor 110. In various embodiments, gas pressure sensor 110 may be capable of measuring the pressure of the gas within shock strut 104 at a desired time. For example, gas pressure sensor 110 may measure the gas pressure within shock strut 104 before, during, or after take-off, or at any point during the duty cycle of shock strut 104.

In various embodiments, shock strut 104 may further comprise, for example, a gas temperature sensor 112. Gas temperature sensor 112 may be capable of measuring the temperature of the gas within shock strut 104 at any point during the duty cycle of shock strut 104.

Similarly, shock strut 104 may comprise an oil pressure sensor 114. In various embodiments, oil pressure sensor 114 may be capable of measuring the pressure of the oil within shock strut 104 at a desired time. For example, oil pressure sensor 114 may measure the oil pressure within shock strut 104 at any point during the duty cycle of shock strut 104.

In various embodiments, shock strut 104 may include various other sensors. Shock strut 104 may include a temperature sensor. A temperature sensor may be used to measure the temperature of oil inside of shock strut 104.

Shock strut 104 may also comprise a position sensor 116. In various embodiments, position sensor 116 may be capable of measuring the position of piston 102 relative to cylinder 108, which is conventionally referred to as the stroke or stroke, of shock strut 104 at a desired time. Position sensor 116 may be configured to measure the position indirectly, for example, by measuring the orientation of one or more shock strut torque links 118 (or other components). For example, position sensor 116 may measure the stroke of shock strut 104 at any point during the duty cycle of shock strut 104.

Figure 2A:
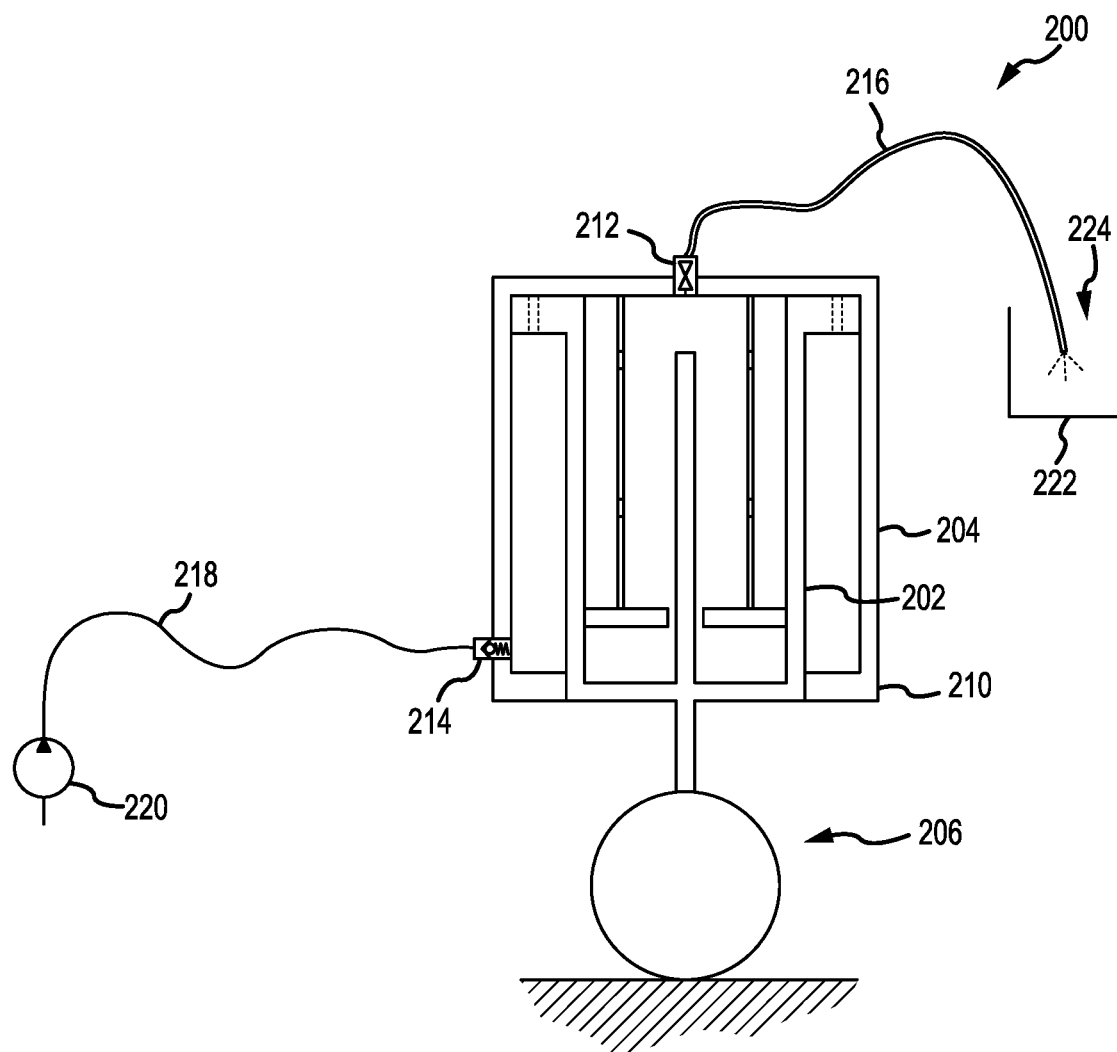
FIG. 2A illustrates, in accordance with various embodiments, a schematic view of a shock strut in a fully compressed position during a weight on wheel oil servicing procedure including filling a strut with oil.

With respect to FIG. 2B through FIG. 2E, elements with like element numbering, as depicted in FIG. 2A, are intended to be the same and will not necessarily be repeated for the sake of clarity.

With reference to FIG. 2A, a schematic view of a shock strut (also referred to herein as a single stage shock strut) 200 is illustrated in a fully compressed position. In various embodiments, shock strut 210 may be similar to shock strut 104 (see FIG. 1). In various embodiments, shock strut 210 may include piston 202 and cylinder 204. In various embodiments, cylinder 204 may be configured to receive piston 202 in a manner that allows the two components to telescope together and absorb and/or dampen forces transmitted by wheel assembly 206.

In various embodiments, shock strut 210 may include a gas charge/dis-charge valve (also referred to herein as a first valve) 212. In various embodiments, gas charge/discharge valve 212 may be used to discharge gas from inside of shock strut 210. In various embodiments, gas charge/discharge valve 212 may be used to charge gas into shock strut 210. In various embodiments, gas charge/discharge valve 212 may be used to charge and/or discharge oil into shock strut 210. In various embodiments, shock strut 210 may include an oil charge/discharge valve (also referred to herein as a second valve) 214. In various embodiments, oil charge/discharge valve 214 may be used to charge oil into shock strut 210. In various embodiments, oil charge/discharge valve 214 may be used to discharge oil from shock strut 210. Although shock strut 210 is described herein as a shock strut comprising two charge/discharge valves 212, 214, the methods as described herein may be performed on a shock strut having a single valve. For example, an adaptor with two ports may be connected to a single valve of shock strut 210, wherein one of the ports is connected to an oil pump and the other port is connected to a charged gas cylinder.

Figure 6:
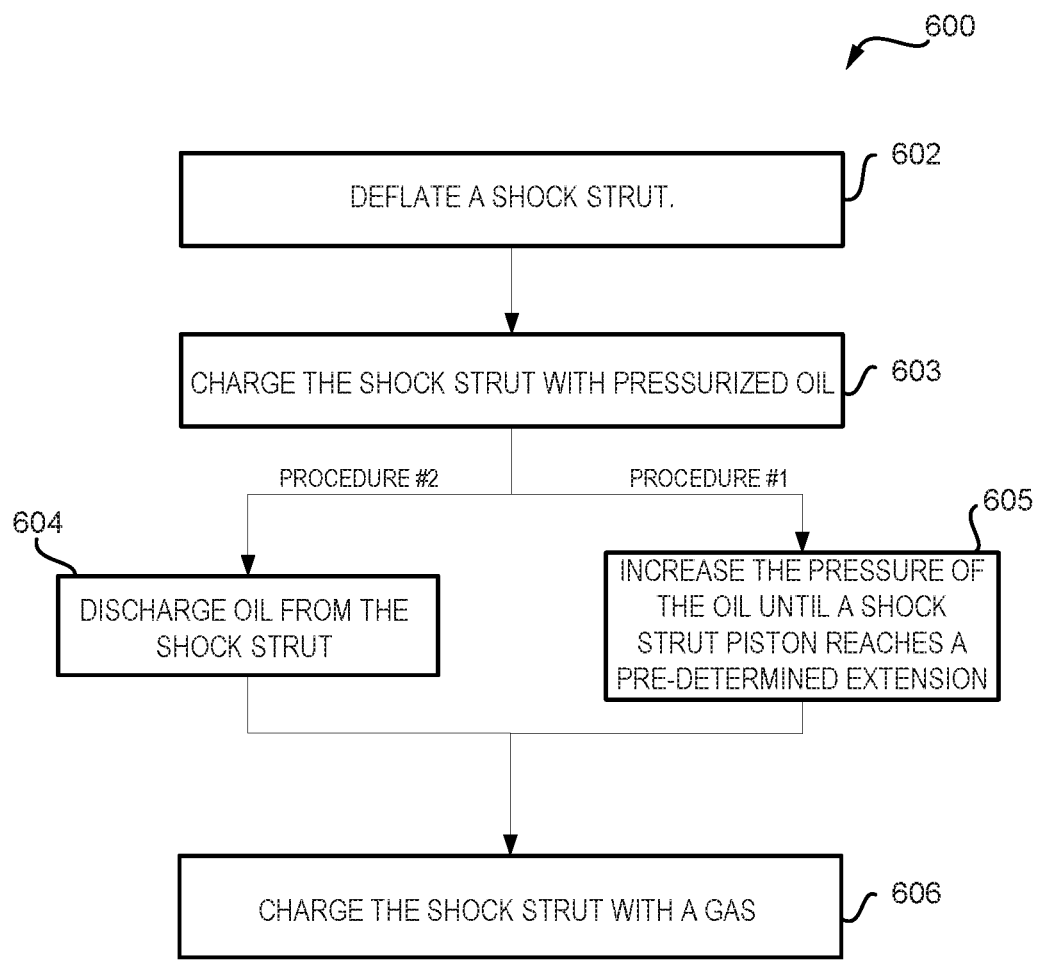
FIG. 6 illustrates, in accordance with various embodiments, a method for weight on wheel servicing of a shock strut.

With momentary reference to FIG. 6 a method for weight on wheel servicing of a shock strut is provided, in accordance with various embodiments.

In various embodiments, a weight on wheel shock strut servicing procedure 200 may be performed. Weight on wheel shock strut servicing procedure 200 may include an oil servicing procedure followed by a gas servicing procedure. In various embodiments, weight on wheel shock strut servicing procedure 200 may begin by deflating the shock strut 210 (Step 602) such that it is in a fully compressed position as illustrated in FIG. 2A. Shock strut 210 may be deflated by removing gas from inside of shock strut 210 via gas charge/discharge valve 212. Stated another way, shock strut 210 may be deflated by opening gas charge/discharge valve 212. However, shock strut 210 may be deflated via any suitable method. The weight of a vehicle, such as an aircraft for example, may compress shock strut 210 into a fully compressed position when servicing is performed weight on wheel. A first hose 216 may be coupled to gas charge/discharge valve 212. In various embodiments, first hose 216 may be a transparent hose. In various embodiments, any air pockets located in oil flowing through first hose 216 may be visible through first hose 216. A second hose 218 may be coupled to the oil charge/discharge valve 214. The second hose 218 may be coupled to an oil pump 220 (see FIG. 2B). Hydraulic fluid (also referred to herein as oil) may be pumped into the shock strut 210. Oil may be pumped into shock strut 210 until oil starts to flow out of the shock strut through first hose 216 as shown at arrow 224. Thus, oil may be cycled through shock strut 210, wherein oil enters shock strut 210 via the oil charge/discharge valve 214 and exits shock strut 210 via gas charge/discharge valve 212. Oil flowing out of first hose 216 may be captured in a container 222 as shown at arrow 224. Gas charge/discharge valve 212 may be closed in response to oil beginning to flow out first hose 216. Accordingly, shock strut 210 may be filled with oil.

Figure 2B:
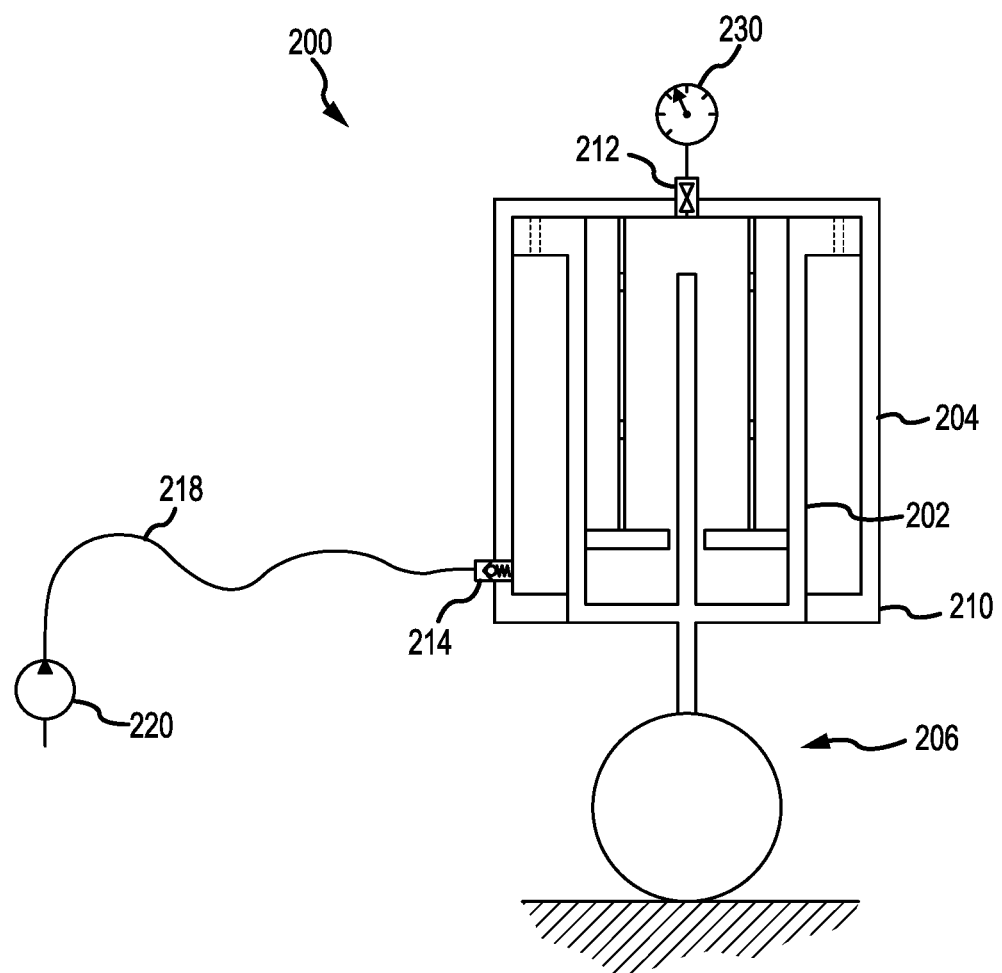
FIG. 2B illustrates, in accordance with various embodiments, a schematic view of a shock strut in a fully compressed position during a weight on wheel oil servicing procedure including charging a strut with pressurized oil.

With reference to FIG. 2B, weight on wheel shock strut servicing procedure 200 of shock strut 210 may be continued by monitoring shock strut 210 internal pressure. As illustrated in FIG. 2B, pressure is monitored by attaching a pressure gauge 230 to charge/discharge valve 212. However, it is contemplated that shock strut 210 internal pressure may be measured using any suitable method. For example, shock strut 210 may be equipped with a gas pressure transducer which may monitor shock strut pressure. Thus, pressure gauge 230 may not be used in some instances. In various embodiments, pressure gauge 230 may be located at charge discharge valve 214 or at oil pump 220.

In various embodiments, a servicing temperature may be measured. The servicing temperature may be the ambient temperature. An operator or technician may determine an oil servicing procedure based upon the measured servicing temperature. In various embodiments, a first or second oil servicing procedure may be performed wherein the first oil servicing procedure involves the shock strut extending during the oil servicing procedure and the second oil servicing procedure involves the shock strut remain fully compressed or retracted during the oil servicing procedure. What follows is a description of a second oil servicing procedure followed by the gas servicing procedure which concludes a weight on wheel shock strut servicing procedure, in accordance with various embodiments. Then, a first oil servicing procedure is described with reference to FIG. 2E, in accordance with various embodiments.

Figure 3:
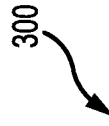
FIG. 3 illustrates, in accordance with various embodiments, a shock strut oil servicing chart.

With momentary reference to FIG. 3, a service chart 300 may be provided. Service chart 300 may indicate to a technician the type of oil servicing procedure to use depending on the servicing temperature. For example, as illustrated in FIG. 2B, if the servicing temperature were negative twenty degrees Celsius (−20° C.) (−4° F.), then service chart 300 may indicate to a technician to use procedure #2 (also referred to herein as a second oil procedure).

In various embodiments, with gas charge/discharge valve 212 closed, oil may be pumped into shock strut 210 via oil charge/discharge valve 214 at pressure (see step 603). In various embodiments, oil may be pumped into shock strut 210 via gas charge/discharge valve 212. Oil may be pumped into shock strut 210 until the internal pressure of the oil inside of shock strut 210 is large enough to crush any pockets of air (also referred to herein as residual air) located inside of shock strut 210 but not large enough to extend shock strut 210. Accordingly, the volume of any residual air inside of shock strut 210 may be reduced to a negligible volume. In various embodiments, a negligible volume may be defined as having reduced the volume of residual air inside of the shock strut 210 by at least ten times. Thus, the pressure of the oil inside of the shock strut may be increased. Stated another way, shock strut 210 may be filled with pressurized oil. For example, oil may be pumped into shock strut 210 until the internal pressure of shock strut 210 reaches between 100 and 150 psig (689.48-1034.21 kPa). Next, oil charge/discharge valve 214 may be closed and second hose 218 removed. The internal pressure of shock strut 210 may be recorded and, if applicable, pressure gauge 230 may be removed. This may complete the oil servicing procedure.

Figure 2C:
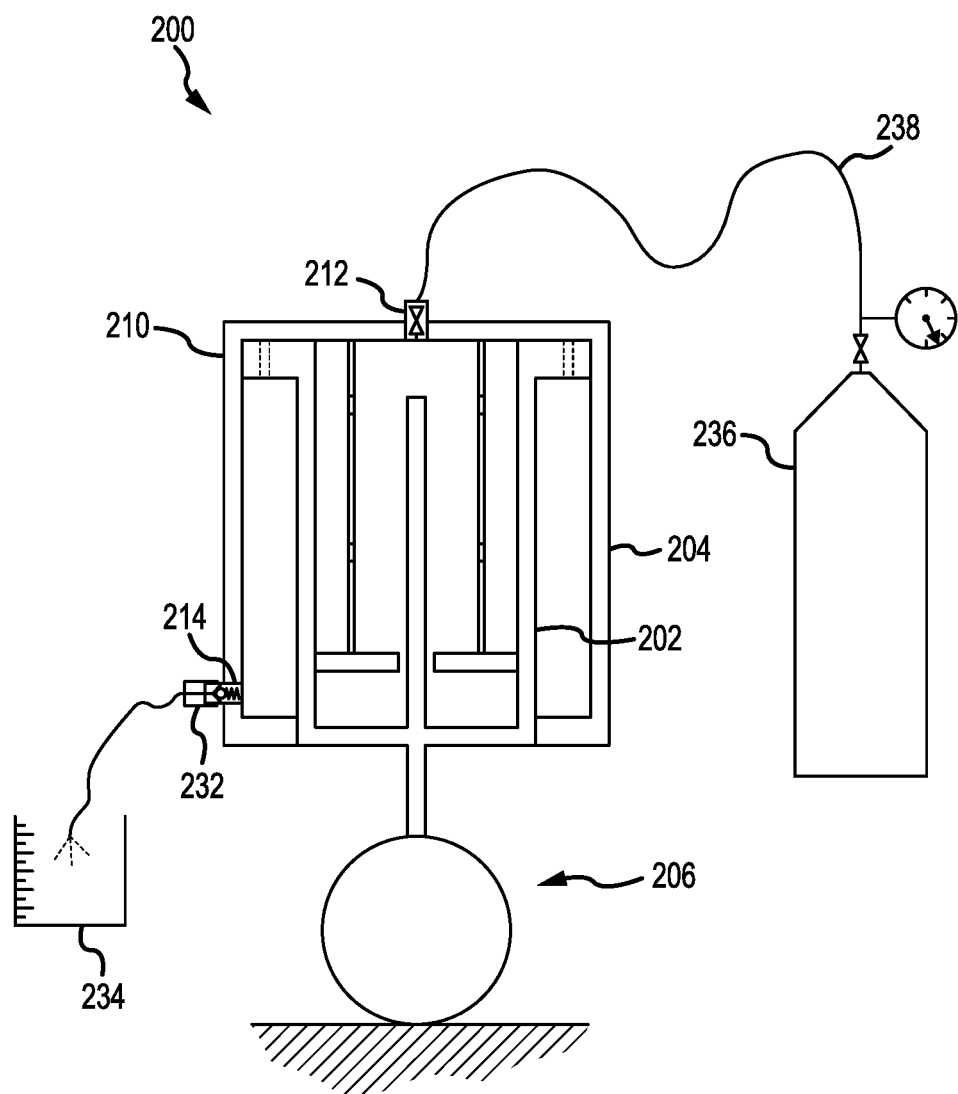
FIG. 2C illustrates, in accordance with various embodiments, a schematic view of a shock strut in a fully compressed position during a weight on wheel servicing procedure according to procedure #2 of the servicing chart in FIG. 3.

With reference to FIG. 2C, a gas servicing procedure may be performed according to procedure #2 of servicing chart (see FIG. 3) following the oil servicing procedure. A compressed gas tank 236 may be coupled to gas charge/discharge valve 212. In various embodiments, compressed gas tank 236 may contain a gas such as nitrogen. However, it is contemplated that any suitable gas may be contained by compressed gas tank 236. In various embodiments, compressed gas tank 236 may be coupled to gas charge/discharge valve 212 via a hose (also referred to herein as a gas charging hose) 238 or any other suitable method. In various embodiments, gas charging hose 238 may be pressurized to a pressure which is greater than the internal pressure of the shock strut before opening gas charge/discharge valve 212 in order to avoid back flow of oil when gas charge/discharge valve 212 is opened. In various embodiments, the gas charge/discharge valve 212 may be opened to maintain pressure inside of shock strut 210.

In various embodiments, with shock strut 210 in a fully compressed position, a variable valve 232 may be coupled to oil charge/discharge valve 214. In various embodiments, variable valve 232 may comprise ground support equipment (GSE). In various embodiments, variable valve 232 may comprise a valve with a variable restriction flow path such that a flow rate of a fluid flowing through variable valve 232 may be varied in a controlled manner. In various embodiments, a measuring element 234 may be used during the gas servicing procedure. In various embodiments, measuring element 234 may comprise a graduated container or the like for measuring the volume of a fluid. The technician may use the variable valve 232 to drain or discharge a pre-determined volume of oil from shock strut 210 (see step 604) into measuring element 234 according to service chart 300 (see FIG. 3). Continuing with the example of a servicing temperature of −20° C., the technician may drain sixteen cubic inches (16 in$^3$) (262.19 cm$^3$) from shock strut 210 into measuring element 234. Thus, shock strut 210 may be filled with a desired amount of oil. The variable valve 232 may then be removed and oil charge/discharge valve 214 closed and capped.

Figure 2D:
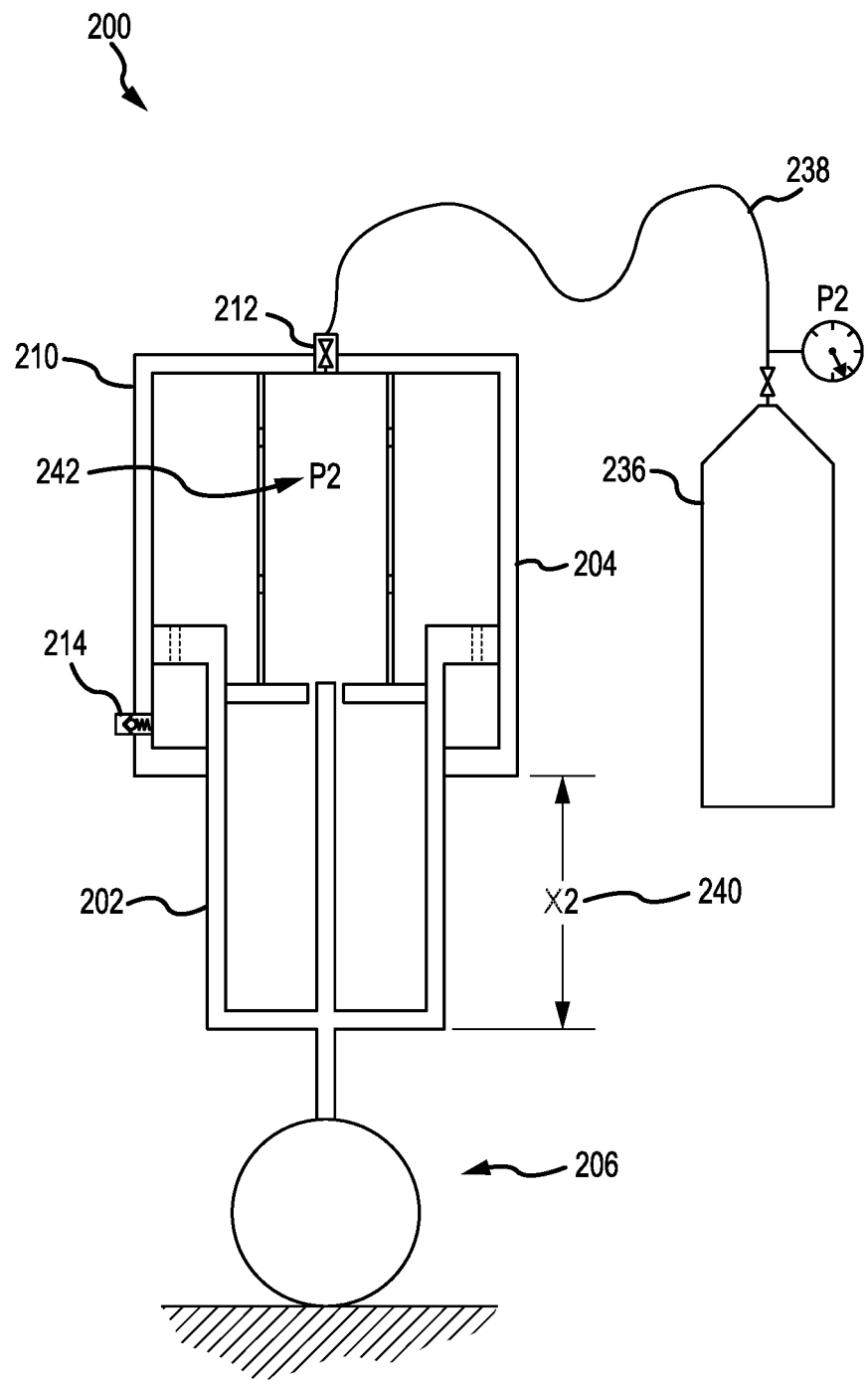
FIG. 2D illustrates, in accordance with various embodiments, a schematic view of a shock strut extended to a pre-determined position during a weight on wheel gas servicing procedure including charging a strut with gas.
Figure 4:
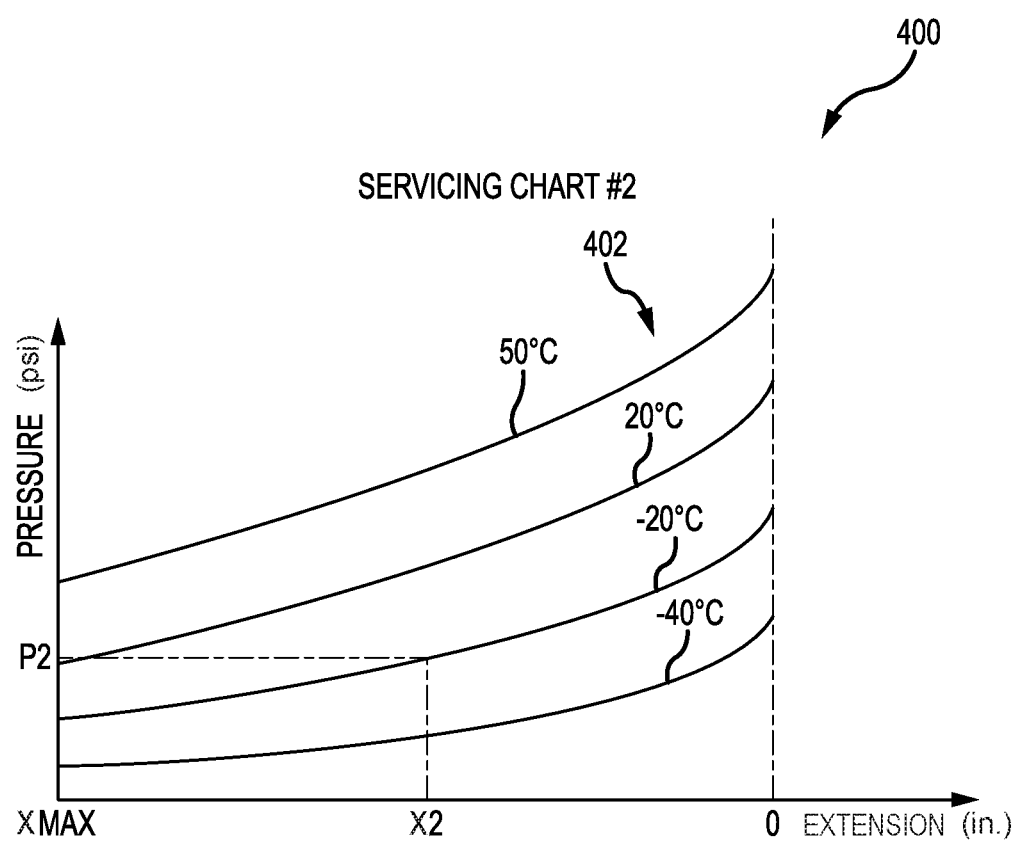
FIG. 4 illustrates, in accordance with various embodiments, a shock strut gas servicing chart.

With reference to FIG. 2D, a continuation of the gas servicing procedure is illustrated. With the desired amount of oil inside of shock strut 210, the gas servicing procedure may continue by charging or inputting gas from compressed gas tank 236 into shock strut 210 via gas charge/discharge valve 212. Accordingly, gas may be charged into shock strut 210 until the internal pressure of shock strut 210 counteracts the weight of a vehicle supported by shock strut 210 and the shock strut 210 extends. With further reference to FIG. 4, gas may be charged into shock strut 210 (see step 606) until the internal pressure "P2" of shock strut 210 and the extension dimension "X2" of shock strut 210 match the reference curves 402 at the servicing temperature as initially used in service chart 300 (see FIG. 3). Thus, FIG. 4 illustrates internal pressure "P2" and extension dimension "X2" matching the reference curves 402 at the servicing temperature of −20° C. In various embodiments, this may determine that weight on wheel shock strut servicing procedure 200 is appropriate.

Figure 2E:
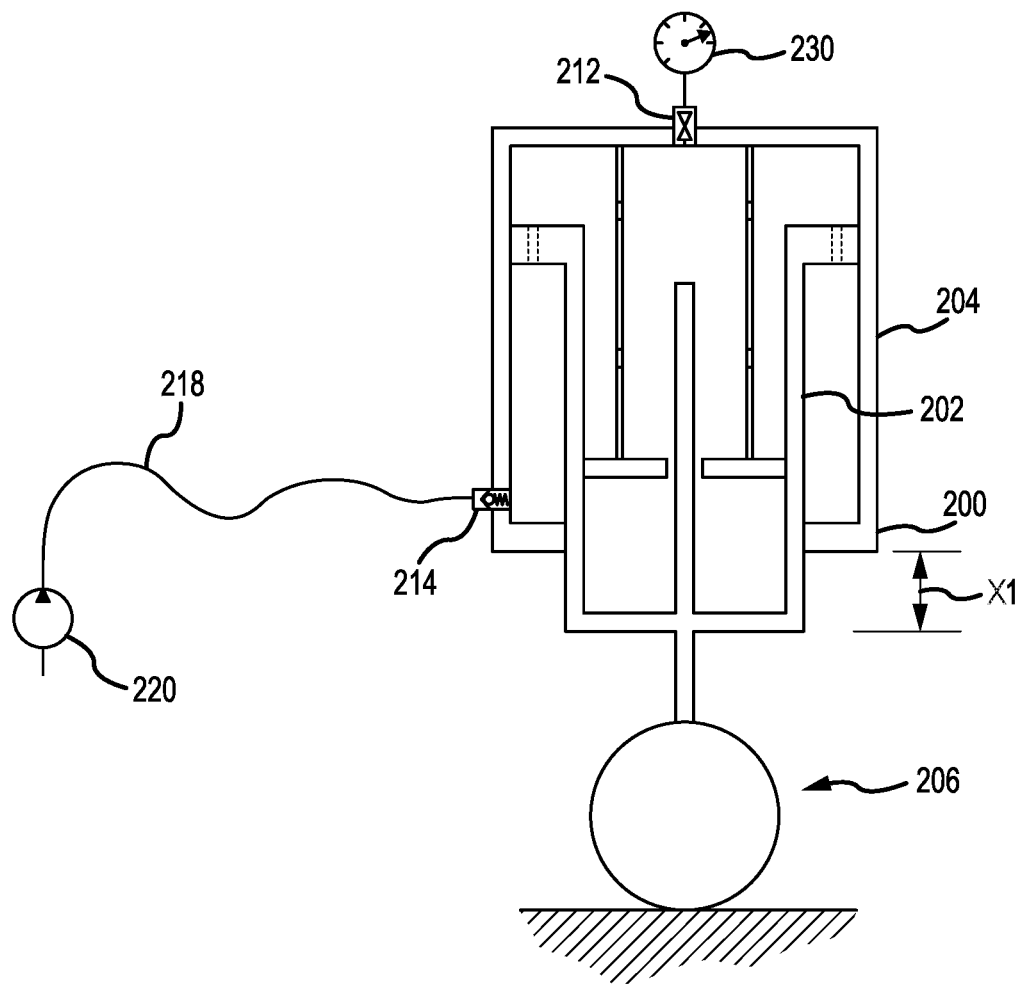
FIG. 2E illustrates, in accordance with various embodiments, a schematic view of a shock strut extended to a pre-determined position during a weight on wheel servicing procedure according to procedure #1 of the servicing chart in FIG. 3.

With reference to FIG. 2E, during weight on wheel shock strut servicing procedure 200 the servicing temperature may be such that service chart 300 (see FIG. 3) indicates to a technician to use Procedure #1 (also referred to herein as a first oil procedure). For example, if the servicing temperature is 50° C., service chart 300 may indicate to use procedure #1. In various embodiments, procedure #1 may include pumping oil into shock strut 210 until the internal pressure counter acts the weight of a vehicle supported by shock strut 210 and piston 202 extends to extension "X1" (also referred to herein as a pre-determined extension) as illustrated in FIG. 2E (see step 605). For example, if the servicing temperature is 50° C., then according to service chart 300 of FIG. 3, oil may be pumped into shock strut 210 until piston 202 extends to an extension "X1" of 0.5". Thus, a greater volume of oil may be pumped into shock strut 210 in procedure #1 than in procedure #2 as described herein. This may compensate for thermal expansion of the oil at higher temperatures. Accordingly, shock strut 210 may be filled with a desired volume of oil. Next, as previously mentioned oil charge/discharge valve 214 may be closed and second hose 218 removed. The internal pressure of shock strut 210 may be recorded and, if applicable, pressure gauge 230 may be removed. This may complete the oil servicing procedure. The gas servicing procedure may then continue as previously described in FIG. 2D in regards to weight on wheel shock strut servicing procedure 200.

Figure 5A:
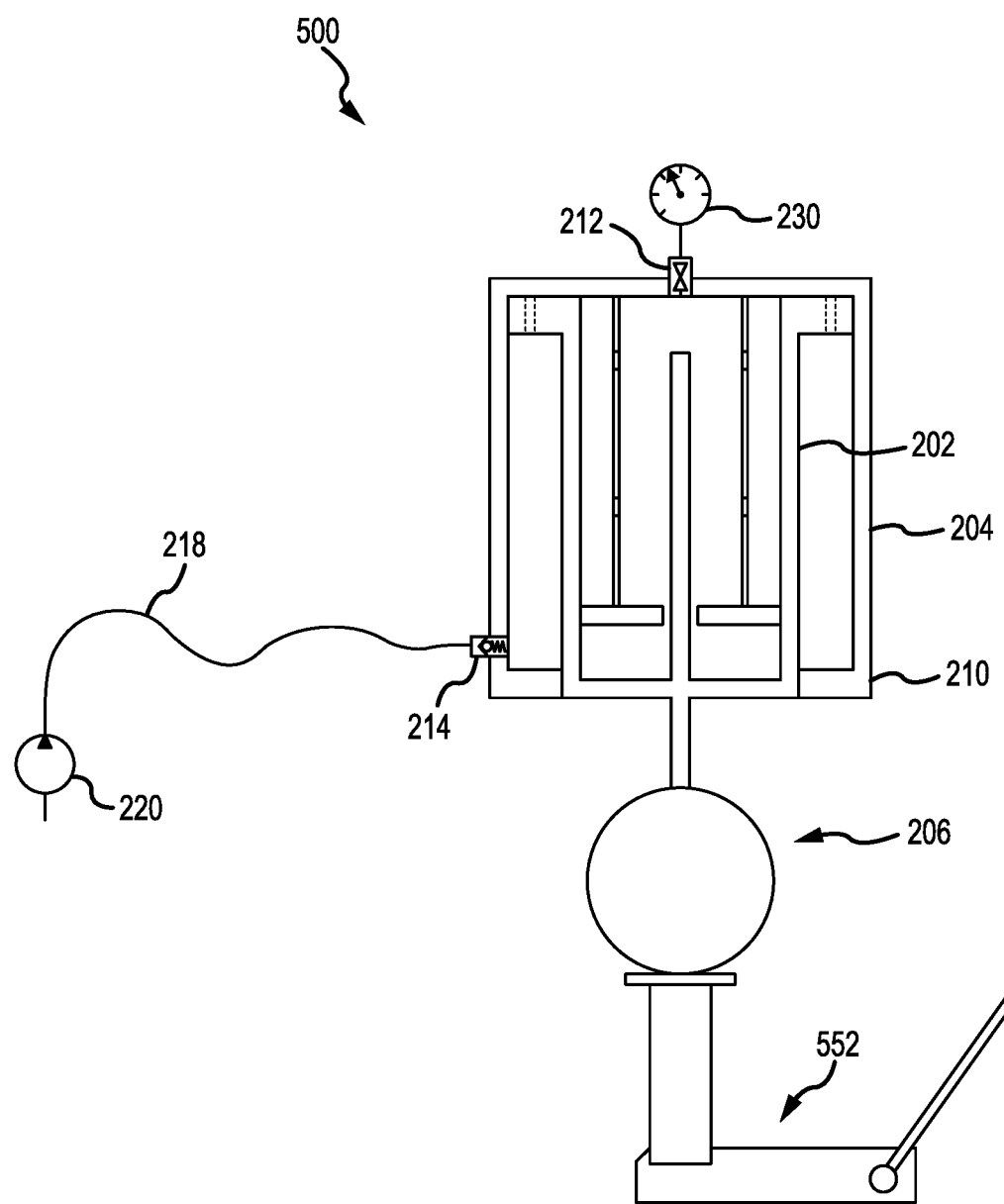
FIG. 5A illustrates, in accordance with various embodiments, a schematic view of a shock strut in a fully compressed position during a weight off wheel servicing procedure according to procedure #2 of the servicing chart in FIG. 3.
Figure 5B:
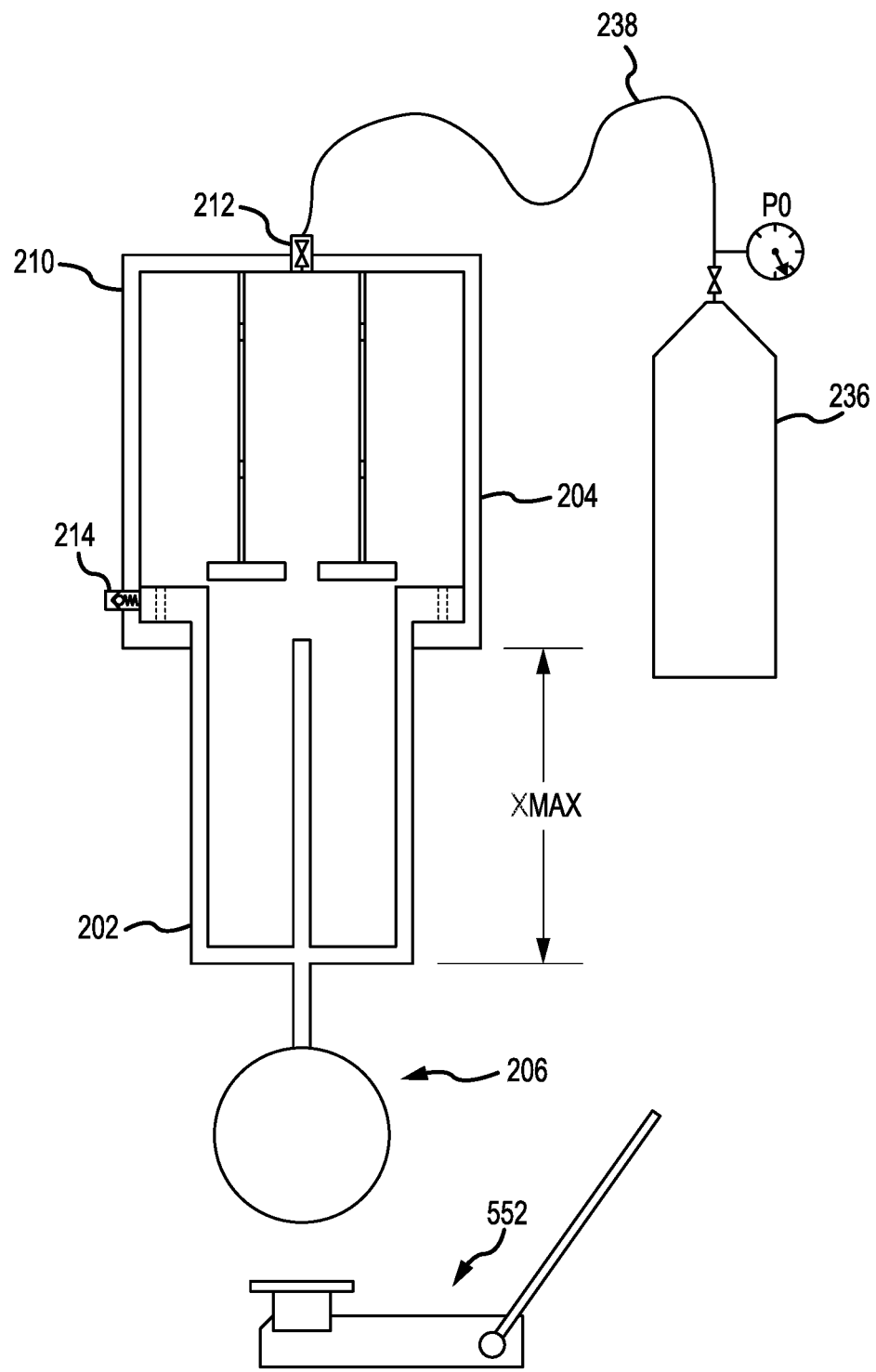
FIG. 5B illustrates, in accordance with various embodiments, a schematic view of a shock strut in a fully extend position during a weight off wheel gas servicing procedure.
Figure 5C:
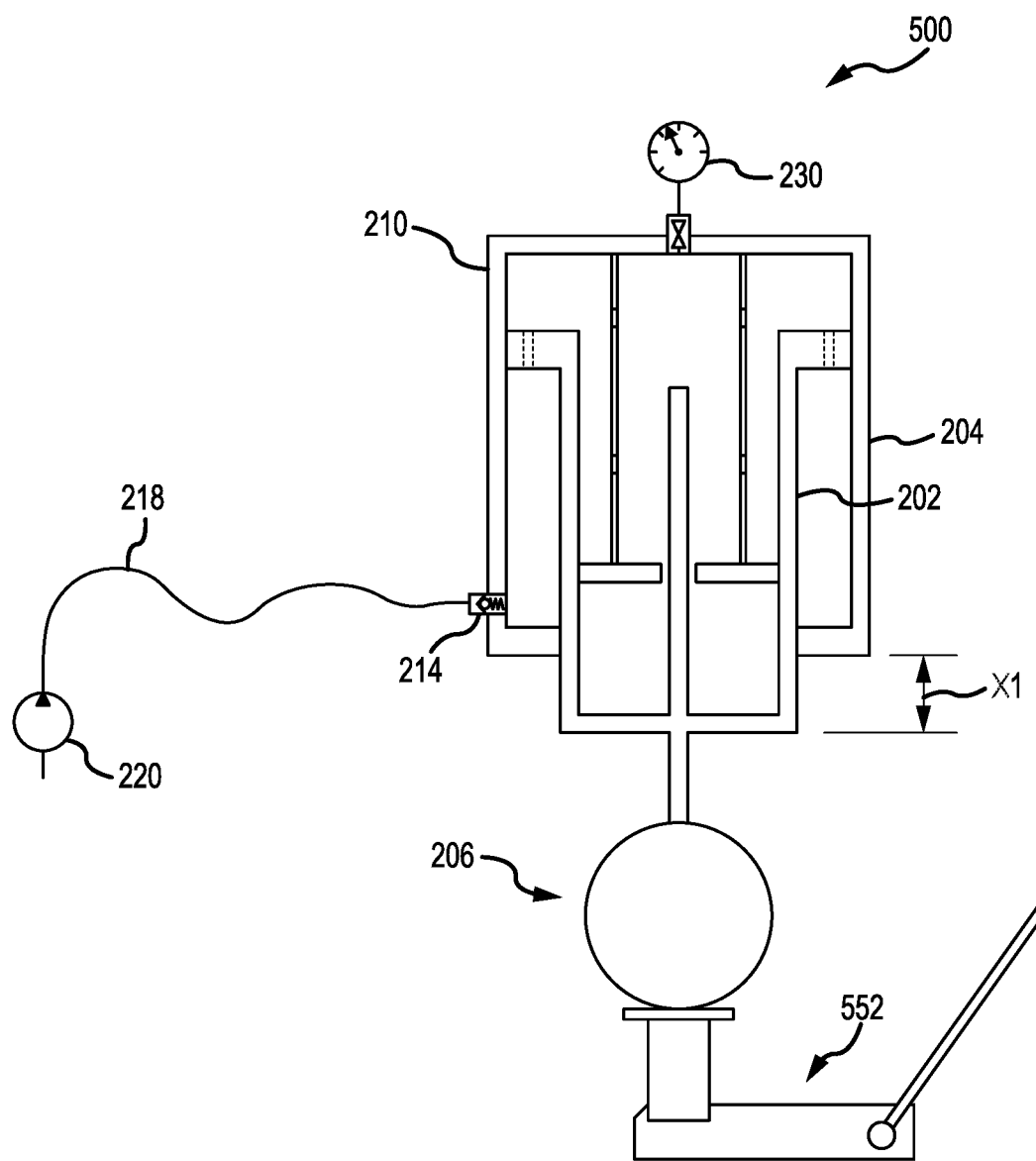
FIG. 5C illustrates, in accordance with various embodiments, a schematic view of a shock strut extended to a pre-determined position during a weight off wheel servicing procedure according to procedure #1 of the servicing chart in FIG. 3.

With respect to FIG. 5A through FIG. 5C, elements with like element numbering, as depicted in FIG. 2A through FIG. 2E, are intended to be the same and will not be repeated for the sake of clarity.

A second oil servicing procedure is described followed by a gas servicing procedure which concludes a weight off wheel shock strut servicing procedure, in accordance with various embodiments. Then, a first oil servicing procedure is described in FIG. 5C, in accordance with various embodiments.

With reference to FIG. 5A, a weight off wheel shock strut servicing procedure 500 may be performed, in accordance with various embodiments. Weight off wheel shock strut servicing procedure 500 may include an oil servicing procedure followed by a gas servicing procedure. In various embodiments, weight off wheel shock strut servicing procedure 500 may be similar to weight on wheel shock strut servicing procedure 200.

Figure 7:
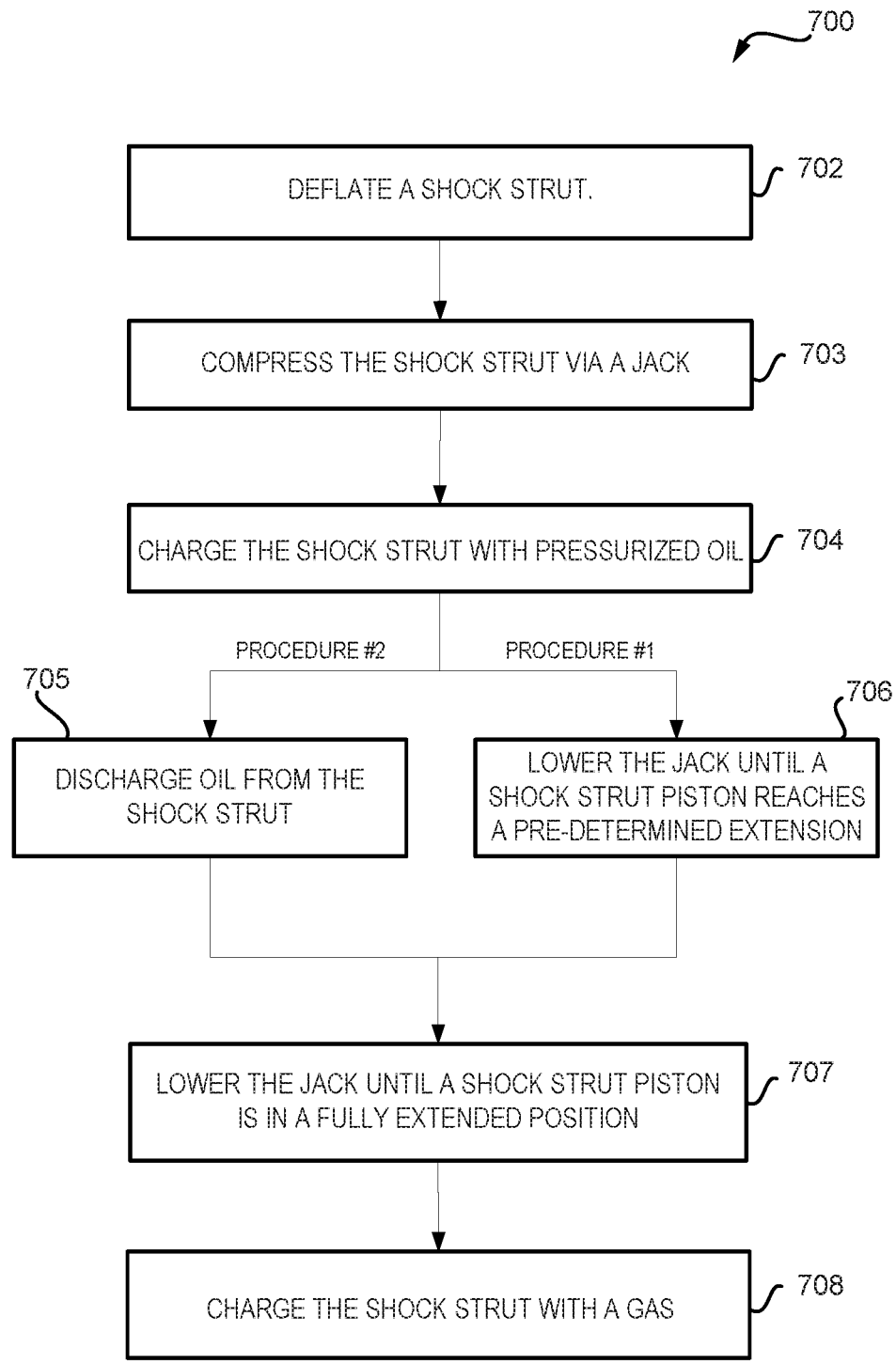
FIG. 7 illustrates, in accordance with various embodiments, a method for weight off wheel servicing of a shock strut.

With momentary reference to FIG. 7 a method 700 for weight off wheel servicing of a shock strut is provided, in accordance with various embodiments.

In various embodiments, weight off wheel shock strut servicing procedure 500 may begin by deflating the shock strut 210 (see step 702) in a similar manner as described in weight on wheel shock strut servicing procedure 200. However, the weight of a vehicle, such as an aircraft for example, may be supported by means other than the wheel assembly 206. Thus, a jack 552 may be used to compress shock strut 210 into a fully compressed position as illustrated in FIG. 5A (see step 703).

As described herein, with momentary reference to FIG. 3, a service chart 300 may be used to determine if a first or second oil servicing procedure should be used to service shock strut 210 according to the servicing temperature. In the event that it is determined that procedure #2 should be used, oil may be pumped into shock strut 210 in a similar manner as described in weight on wheel shock strut servicing procedure 200 until the internal pressure of the oil inside of shock strut 210 is large enough to crush any pockets of air (also referred to herein as residual air) located inside of shock strut 210 but not large enough to extend shock strut 210 (see step 704). For example, oil may be pumped into shock strut 210 until the internal pressure of shock strut 210 reaches between 100 and 150 psig (689.48-1034.21 kPa). Next, oil charge/discharge valve 214 may be closed and second hose 218 removed. The internal pressure of shock strut 210 may be recorded and, if applicable, pressure gauge 230 may be removed. This may complete the oil servicing procedure. Similar to weight on wheel procedure, following the oil servicing procedure, a compressed gas tank 236 may be coupled to gas charge/discharge valve 212 and a variable valve 232 (see FIG. 2C) may be used to drain or discharge a pre-determined volume of oil from shock strut 210 (see step 705) into measuring element 234 (see FIG. 2C) according to service chart 300 (see FIG. 3) while oil remains pressurized by the gas tank 236 (see FIG. 5B).

With reference to FIG. 5B, a gas servicing procedure is illustrated, in accordance with various embodiments, for a weight off wheel shock strut servicing procedure 500. In various embodiments, gas may then be charged into shock strut 210 via compressed gas tank 236. Jack 552 may then be slowly lowered while gas is charged into shock strut 210 until shock strut 210 is in a fully extended position as illustrated in FIG. 5B (see step 707). Shock strut 210 may comprise an extension dimension "$X_{max}$" (also referred to herein as a pre-determined extension) when shock strut 210 is in a fully extended position. Gas may continue to be charged into shock strut 210 until the internal pressure of shock strut 210 reaches a value that corresponds to the reference curves 402 given in servicing chart 400 (see FIG. 4) corresponding to the servicing temperature and an extension of "$X_{max}$" (see step 708). When the desired pressure is reached, gas charge/discharge valve may be closed and the compressed gas tank removed from shock strut 210.

With reference to FIG. 5C, procedure #1 (see FIG. 3) for weight off wheel shock strut servicing procedure 500 is described, in accordance with various embodiments. Oil may be pumped into shock strut 210 via oil charge/discharge valve 214 until the internal pressure of shock strut 210 is large enough to crush any pockets of residual air located inside of shock strut 210 but not large enough to extend shock strut 210. Next, while oil pressure is maintained by pumping oil into shock strut 210, jack 552 may be slowly lowered until piston 202 has extended to a pre-determined extension "X1" according to service chart 300 (see FIG. 3) (see step 706). Next, oil charge/discharge valve 214 may be closed and second hose 218 removed. The internal pressure of shock strut 210 may be recorded and, if applicable, pressure gauge 230 may be removed. This may complete the oil servicing procedure. The gas servicing procedure may then continue as previously described in FIG. 5B in regards to weight off wheel shock strut servicing procedure 500.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for servicing a shock strut comprising:
   deflating the shock strut;
   compressing the shock strut until the shock strut is in a fully compressed position;
   with the shock strut in the fully compressed position, charging the shock strut with a liquid until a pressure of the liquid decreases a volume of a residual air located inside of the shock strut; and
   with the shock strut in the fully compressed position, discharging a pre-determined volume of liquid from the shock strut.

2. The method of claim 1, further comprising charging the shock strut with a gas.

3. The method of claim 1, wherein the shock strut includes a first valve and a second valve.

4. The method of claim 1, wherein the compressing is performed via at least one of a jack or a weight of a vehicle, the vehicle supported at least in part by the shock strut.

* * * * *